United States Patent
Kini et al.

(10) Patent No.: US 9,535,997 B2
(45) Date of Patent: Jan. 3, 2017

(54) MANAGING SEARCH-ENGINE-OPTIMIZATION CONTENT IN WEB PAGES

(71) Applicant: International Business Machines Corporation, Armonk, NY (US)

(72) Inventors: Pavan Kini, Bangalore (IN); Rakesh Kote, Bangalore (IN); Karson Ng, Maple (CA); Walfrey Ng, Markham (CA); Siddharth Cuduvalli Ravi Kanth Rao, Bangalore (IN); Guru Prasad Shamanna, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 13/843,901

(22) Filed: Mar. 15, 2013

(65) Prior Publication Data

US 2013/0232131 A1 Sep. 5, 2013

Related U.S. Application Data

(63) Continuation of application No. 13/411,585, filed on Mar. 4, 2012.

(51) Int. Cl.
*G06F 17/30* (2006.01)
*G06Q 30/06* (2012.01)

(52) U.S. Cl.
CPC ..... *G06F 17/30864* (2013.01); *G06Q 30/0613* (2013.01)

(58) Field of Classification Search
CPC .................................. G06F 17/30; G06F 17/00
See application file for complete search history.

(56) References Cited

U.S. PATENT DOCUMENTS

| | | | | |
|---|---|---|---|---|
| 5,594,837 | A | * | 1/1997 | Noyes ...................... G06N 5/02 706/11 |
| 5,878,406 | A | * | 3/1999 | Noyes ...................... G06N 5/02 706/55 |
| 6,650,348 | B2 | * | 11/2003 | Mariani et al. ............... 715/853 |

(Continued)

OTHER PUBLICATIONS

Darrie, Cristian and Slrovich, Jamie, "Professional Search Engine Optimization with ASP.NET: A Developer's Guide to SEO," Wrox Publishers, Aug. 23, 2007, Chapter 14, pp. 319-350 (34 total pages).*

(Continued)

*Primary Examiner* — Farhan Syed
(74) *Attorney, Agent, or Firm* — Nelson and Nelson; Daniel P. Nelson; Alexis V. Nelson

(57) ABSTRACT

A method for managing the Search Engine Optimization (SEO) content of web pages is disclosed. In one embodiment, such a method includes providing a set of web pages organized in a hierarchical structure. Each web page has an SEO content pattern associated therewith. The method establishes an inheritance scheme for the hierarchical structure such that the SEO content patterns of parent web pages are inherited by children web pages. The method further enables a user to override the inheritance scheme for selected web pages such that the SEO content patterns of the selected web pages override the SEO content patterns of their respective parent web pages. A corresponding apparatus and computer program product are also disclosed.

6 Claims, 7 Drawing Sheets

(56) References Cited

U.S. PATENT DOCUMENTS

| | | | |
|---|---|---|---|
| 6,917,972 B1* | 7/2005 | Basko et al. | 709/224 |
| 6,990,653 B1* | 1/2006 | Burd et al. | 717/108 |
| 7,120,897 B2* | 10/2006 | Ebbo et al. | 717/108 |
| 7,237,002 B1* | 6/2007 | Estrada et al. | 709/203 |
| 7,389,287 B1 | 6/2008 | Burke | |
| 7,555,722 B2* | 6/2009 | Karatal et al. | 715/762 |
| 7,653,659 B2* | 1/2010 | Kussmaul et al. | 707/999.107 |
| 7,730,021 B1* | 6/2010 | Morse et al. | 707/602 |
| 7,739,658 B2* | 6/2010 | Watson et al. | 717/108 |
| 7,752,073 B2* | 7/2010 | Barry et al. | 705/14.7 |
| 7,792,830 B2* | 9/2010 | Carmel et al. | 707/728 |
| 7,805,428 B2* | 9/2010 | Batista Reyes | G06F 17/30864 707/706 |
| 7,853,589 B2* | 12/2010 | Svore et al. | 707/728 |
| 7,877,392 B2 | 1/2011 | Grieselhuber et al. | |
| 7,904,443 B2* | 3/2011 | Neuneier et al. | 707/709 |
| 7,908,263 B1 | 3/2011 | Paiz | |
| 7,962,510 B2* | 6/2011 | Najork et al. | 707/771 |
| 7,987,173 B2* | 7/2011 | Alexander | 707/709 |
| 8,108,395 B2* | 1/2012 | Kussmaul et al. | 707/737 |
| 8,150,716 B1* | 4/2012 | Lunsford et al. | 705/7.11 |
| 8,249,855 B2* | 8/2012 | Zhou et al. | 704/2 |
| 8,255,384 B2* | 8/2012 | Prasad et al. | 707/709 |
| 8,285,702 B2* | 10/2012 | Carmel et al. | 707/709 |
| 8,352,464 B2* | 1/2013 | Fotev | 707/723 |
| 8,364,540 B2* | 1/2013 | Soroca | G06F 17/30035 705/14.64 |
| 8,386,921 B2* | 2/2013 | Barry et al. | 715/234 |
| 8,468,244 B2* | 6/2013 | Redlich | G06Q 10/06 705/50 |
| 9,058,242 B2* | 6/2015 | Adams | G06F 17/00 |
| 2002/0093540 A1* | 7/2002 | Mariani et al. | 345/853 |
| 2002/0194194 A1* | 12/2002 | Fenton et al. | 707/104.1 |
| 2003/0025728 A1* | 2/2003 | Ebbo et al. | 345/744 |
| 2004/0049574 A1* | 3/2004 | Watson et al. | 709/224 |
| 2004/0083127 A1* | 4/2004 | Lunsford et al. | 705/10 |
| 2004/0220791 A1* | 11/2004 | Lamkin | G06F 17/30017 703/11 |
| 2004/0220926 A1* | 11/2004 | Lamkin | G06F 17/30017 |
| 2006/0184500 A1* | 8/2006 | Najork et al. | 707/1 |
| 2006/0224593 A1* | 10/2006 | Benton et al. | 707/10 |
| 2006/0294083 A1* | 12/2006 | Benton et al. | 707/3 |
| 2008/0270376 A1* | 10/2008 | Svore et al. | 707/5 |
| 2008/0319950 A1 | 12/2008 | Lasa et al. | |
| 2009/0150372 A1* | 6/2009 | Batista Reyes | G06F 17/30864 |
| 2009/0222432 A1* | 9/2009 | Ratnakar | 707/5 |
| 2009/0254572 A1* | 10/2009 | Redlich | G06Q 10/06 |
| 2009/0292677 A1* | 11/2009 | Kim | G06F 17/3089 |
| 2009/0320119 A1* | 12/2009 | Hicks et al. | 726/9 |
| 2010/0036828 A1* | 2/2010 | Carmel et al. | 707/5 |
| 2010/0042613 A1* | 2/2010 | Malden et al. | 707/5 |
| 2010/0094878 A1* | 4/2010 | Soroca | G06F 17/30035 707/748 |
| 2010/0114864 A1* | 5/2010 | Agam et al. | 707/709 |
| 2010/0332515 A1 | 12/2010 | Carraher et al. | |
| 2011/0022578 A1* | 1/2011 | Fotev | 707/706 |
| 2011/0055400 A1* | 3/2011 | Alexander | 709/226 |
| 2011/0178973 A1* | 7/2011 | Lopez | G06F 17/24 706/48 |
| 2011/0219295 A1* | 9/2011 | Adams | G06F 17/00 715/234 |
| 2011/0258049 A1* | 10/2011 | Ramer | G06F 17/30867 705/14.66 |
| 2011/0258528 A1* | 10/2011 | Roper et al. | 715/234 |
| 2011/0313852 A1* | 12/2011 | Kon et al. | 705/14.46 |
| 2012/0005211 A1* | 1/2012 | Ayoub et al. | 707/737 |
| 2012/0016897 A1* | 1/2012 | Tulumbas et al. | 707/759 |
| 2012/0124462 A1* | 5/2012 | Bannoura | G06F 9/45516 715/234 |
| 2013/0304581 A1* | 11/2013 | Soroca | G06F 17/30035 705/14.64 |
| 2015/0254251 A1* | 9/2015 | Adams | G06F 17/00 707/709 |

OTHER PUBLICATIONS

Sohail, Abrar. "Search Engine Optimization Methods & Search Engine Indexing for CMS Applications." PhD diss., Lappeenranta University of Technology, 2012.*

Kanwal, Wasfa. "Exploring Search Engine Optimization (SEO) Techniques for Dynamic Websites." (2011).*

Search Engine Optimization Specialists, "Privacy Policy—Commitment to Your Privacy," Copyright 2007, available at http://www.seodesignsolutions.com/privacy-policy.html.

Sitecore, "Search Engine Optimization Techniques and Technology to Automate and Grow Your Website Traffic," Whitepaper, Copyright 2007, available at http://www.212nyc.org/whitepapers_docs/SEO%20Whitepaper.pdf.

iData Technologies, "SEO and CMS:How will a CMS impact my SEO efforts?," Copyright 2005-2011, available at http://www.idatatechnologies.com/en-US/SEO_and_CMS_how_do_they_Relate.aspx.

* cited by examiner

MANAGING SEARCH-ENGINE-OPTIMIZATION CONTENT IN WEB PAGES

BACKGROUND

Field of the Invention

This invention relates to apparatus and methods for managing search-engine-optimization content in web pages.

Background of the Invention

Many shoppers begin their search for a product using a preferred search engine, such as Google, to return a list of relevant websites. Shoppers may then browse through the first few pages of websites in the list to learn about the product, possibly resulting in a purchase. Because of this commonly-used approach to shopping, search engine optimization (SEO) is extremely important to increase page ranking and ensure that a website shows up in the first few pages of the search results. When search engines analyze web pages to determine ranking, they typically focus on specific web page elements referred to as "SEO content fields." These SEO content fields include, for example, Page Title, Meta Description, Meta Keyword, and Image Alternate Description fields.

It is important to effectively manage content in SEO content fields to influence search engine optimization and page ranking. This can be challenging since online retailers may have thousands or even millions of products and web pages. The catalog structure for an online retailer's products can be very complex. Each category or sub-category may contain many products. Each product may contain many items with specific attributes (e.g., color and/or size). A single product may belong to multiple categories.

To add another dimension to the complexity, some online retailers may have multiple online sites that target different shoppers. Some products may be shared by the multiple sites. Other products (such as local products) may only reside on a single site or a subset of the multiple sites. Such sites are often referred to as "extended sites." Managing the SEO content of extended sites can be challenging due to the complexity involved.

Currently, there are several approaches for managing SEO content in web pages. One approach is for business objects to have specific database fields that can be populated with SEO content. A drawback of this approach is that if an online retailer has thousands or millions of items/products, it is difficult to provide SEO content for each item/product. For example, the page title for a product may use the pattern "product name" at "store name" (e.g., White Arm Chair at StoreX). However, the retailer may not want all items, products, or categories to share this pattern. For example, the retailer may want products that are under promotion to have a different page title pattern. Using the approach described above, SEO content fields need to be provided for each product, resulting in undesired performance overhead.

Another approach is to populate the SEO content fields of web pages using properties file messages. This approach has the drawback that it tightly couples SEO content fields with web pages. There is no flexibility to have different content or patterns for specific groups of items/products/categories. Another disadvantage of this approach is that it does not allow business users to freely modify the content in SEO content fields to influence page rank. IT developers are typically needed to effectuate the desired changes. Each time IT developers make changes, regression testing needs to be performed to ensure that the changes did not introduce other problems.

Both of the approaches discussed above have drawbacks with respect to extended sites. For example, a product or group of products may be shared by two extended sites, but may use a different page title pattern on each extended site. A retailer may want some extended sites to share some or all of the SEO content patterns of other extended sites, while wanting other extended sites not to do so. Both approaches discussed above are unable to handle this dimension of complexity.

In view of the foregoing, what are needed are apparatus and methods to more efficiently manage SEO content in web pages. Ideally, such apparatus and methods will be capable of handling the additional complexity inherent in extended sites environments.

SUMMARY

The invention has been developed in response to the present state of the art and, in particular, in response to the problems and needs in the art that have not yet been fully solved by currently available apparatus and methods. Accordingly, the invention has been developed to provide apparatus and methods to more efficiently manage Search Engine Optimization (SEO) content in web pages. The features and advantages of the invention will become more fully apparent from the following description and appended claims, or may be learned by practice of the invention as set forth hereinafter.

Consistent with the foregoing, a method for managing the Search Engine Optimization (SEO) content of web pages is disclosed herein. In one embodiment, such a method includes providing a set of web pages organized in a hierarchical structure. Each web page has an SEO content pattern associated therewith. The method establishes an inheritance scheme for the hierarchical structure such that the SEO content patterns of parent web pages are inherited by children web pages. The method further enables a user to override the inheritance scheme for selected web pages such that the SEO content patterns of the selected web pages override the SEO content patterns of their respective parent web pages.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
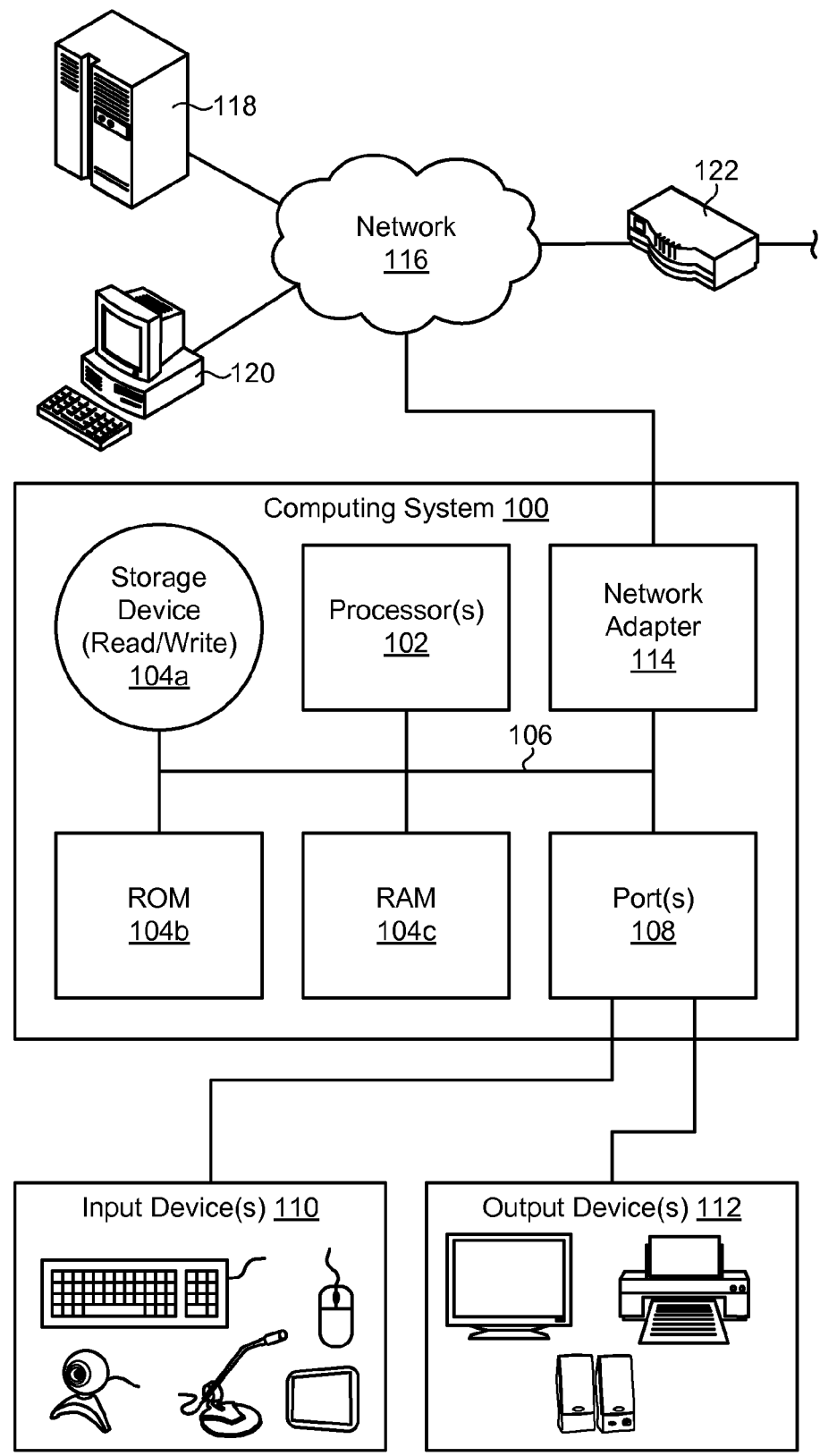
FIG. 1 is a high-level block diagram showing one example of a computing system in which an apparatus and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java™, Smalltalk, C++, or the like, conventional procedural programming languages such as the "C" programming language, scripting languages such as JavaScript, or similar programming languages. Computer program code for implementing the invention may also be written in a low-level programming language such as assembly language.

Embodiments of the invention may be described below with reference to flowchart illustrations and/or block diagrams of methods, apparatus, systems, and computer program products. It will be understood that each block of the flowchart illustrations and/or block diagrams, and combinations of blocks in the flowchart illustrations and/or block diagrams, may be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a computing system 100 is illustrated. The computing system 100 is presented to show one example of an environment where an apparatus and method in accordance with the invention may be implemented. The computing system 100 is presented only by way of example and is not intended to be limiting. Indeed, the apparatus and methods disclosed herein may be applicable to a wide variety of different computing systems in addition to the computing system 100 shown. The apparatus and methods disclosed herein may also potentially be distributed across multiple computing systems 100.

As shown, the computing system 100 includes at least one processor 102 and may include more than one processor 102. The processor 102 may be operably connected to a memory 104. The memory 104 may include one or more non-volatile storage devices such as hard drives 104a, solid state drives 104a, CD-ROM drives 104a, DVD-ROM drives 104a, tape drives 104a, or the like. The memory 104 may also include non-volatile memory such as a read-only memory 104b (e.g., ROM, EPROM, EEPROM, and/or Flash ROM) or volatile memory such as a random access memory 104c (RAM or operational memory). A bus 106, or plurality of buses 106, may interconnect the processor 102, memory devices 104, and other devices to enable data and/or instructions to pass therebetween.

To enable communication with external systems or devices, the computing system 100 may include one or more ports 108. Such ports 108 may be embodied as wired ports 108 (e.g., USB ports, serial ports, Firewire ports, SCSI ports, parallel ports, etc.) or wireless ports 108 (e.g., Bluetooth, IrDA, etc.). The ports 108 may enable communication with one or more input devices 110 (e.g., keyboards, mice, touchscreens, cameras, microphones, scanners, storage devices, etc.) and output devices 112 (e.g., displays, monitors, speakers, printers, storage devices, etc.). The ports 108 may also enable communication with other computing systems 100.

In certain embodiments, the computing system 100 includes a network adapter 114 to connect the computing system 100 to a network 116, such as a LAN, WAN, or the Internet. Such a network 116 may enable the computing system 100 to connect to one or more servers 118, workstations 120, personal computers 120, mobile computing devices, or other devices. The network 116 may also enable the computing system 100 to connect to another network by way of a router 122 or other device 122. Such a router 122 may allow the computing system 100 to communicate with servers, workstations, personal computers, or other devices located on different networks.

Figure 2:
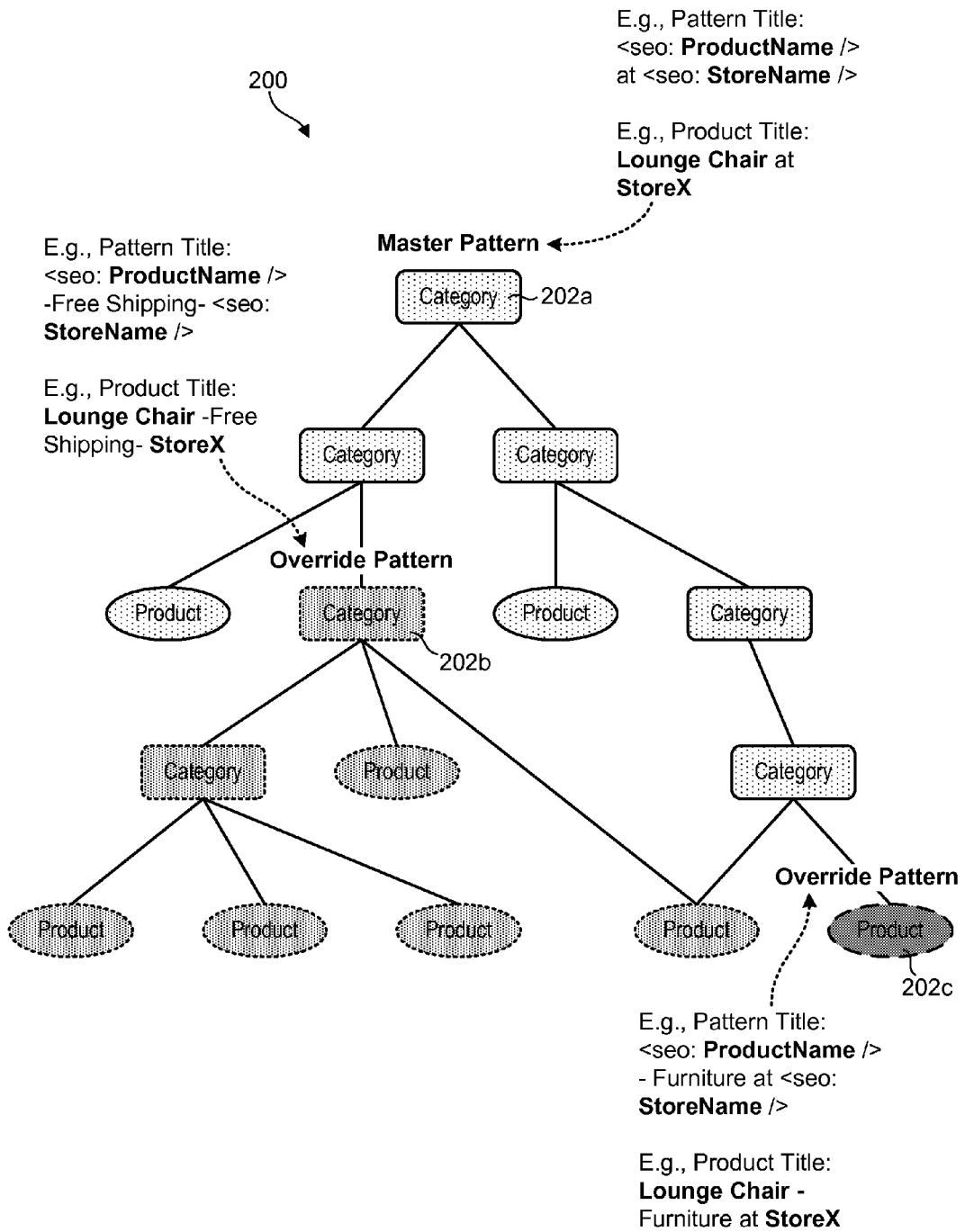
FIG. 2 shows one example of a hierarchical structure comprising multiple web pages, and how SEO content patterns may be inherited or overridden in the hierarchical structure.

Referring to FIG. 2, one example of a hierarchical structure 200 comprising a plurality of web pages is illustrated. Such a hierarchical structure 200 may represent the catalog structure for an online store. In this example, the hierarchical structure 200 includes a plurality of web pages to display categories (and sub-categories) and products. In other embodiments, the hierarchical structure 200 includes other web pages to display items. A "polo shirt" may be considered a product whereas specific colors and/or sizes of the polo shirt may be considered items. The polo shirt may belong to category "shirts" which may in turn belong to category "clothing." For the sake of simplicity, a hierarchical structure 200 is illustrated that only includes category pages (represented by the rectangular shapes) and product pages (represented by the oval shapes).

The apparatus and methods disclosed herein provide a framework for defining SEO content patterns for a set of web pages that display a type of business object. Instead of defining a separate SEO content pattern for each web page in a hierarchical structure 200, the framework allows a user to define a single SEO content pattern (labeled "Master Pattern" in FIG. 2) for a top level web page. This SEO content pattern may be inherited by web pages that are children of the top level web page, without having to define separate SEO content patterns for the children. Using this technique, the SEO content pattern can be an independent entity that can be managed separately from specific web pages, rather than being tightly coupled to web pages.

The SEO content patterns described herein contain business object property tags which are replaced at runtime with actual business object property values. Web developers may use standard page usages to retrieve the page-specific SEO content. Business user may then define relevant SEO content patterns for these page usages using business tools. Business users may accomplish this without information technology (IT) support.

For example, as shown in FIG. 2, a business user may define an SEO content pattern for the title of a web page as follows: "<seo: ProductName/> at <seo: StoreName/>". This SEO content pattern may be defined once for the top-level web page 202a. Other web pages below the top-level web page 202a may inherit the SEO content pattern from the top-level web page 202a. At runtime, the object property tag "Product Name" is replaced with an actual product name (e.g., "Lounge Chair") and the object property tag "StoreName" is replaced with an actual store name (e.g., "StoreX") to produce the page title "Lounge Chair at StoreX" (the ProductName and StoreName may be replaced with an actual store name and product name using a store ID and product ID). In this manner, generic SEO content patterns containing business object property tags may be defined for page usages (e.g., items, products, categories) that apply to all instances of the page usages. At runtime, the object property tags are replaced by specific values pertaining to the instances.

In certain cases, it may be desirable that certain items, products, and/or categories in the hierarchical structure 200 have different SEO content patterns. That is, flexibility is needed to allow some items, products, and/or categories to have different SEO content patterns than other items, products, and/or categories. For example, it may be desirable that certain products under promotion have their own page title pattern. To accomplish this, the disclosed framework enables SEO content patterns to be overridden and replaced with new SEO content patterns (or specific fields of SEO content patterns) at any level of the hierarchical structure 200. More specifically, the SEO content pattern for a page usage may be overridden and replaced with a new SEO content pattern for a specific instance of the page usage. Thus, a business user can choose to either apply a parent's SEO content pattern to its child or override the parent's SEO content pattern (or selected fields in the parent's SEO content pattern) with a new SEO content pattern (or fields of an SEO content pattern) for the child.

For example, at the category web page 202b of the hierarchical structure 200, the Master Pattern may be overridden and replaced by a first Override Pattern. This first Override Pattern may define the page title for a product to be "<seo: ProductName/>—Free Shipping—<seo: StoreName/>". At runtime, the object property tags are replaced with actual values to produce a page title such as "Lounge Chair—Free Shipping—StoreX". In certain embodiments, any children of the web page 202b for which the first Override Pattern is established will inherit the first Override Pattern, as shown by the shading in FIG. 2.

In another example, at a product web page 202c in the hierarchical structure 200, the Master Pattern may be overridden and replaced by a second Override Pattern. This second Override Pattern may define the page title for a product to be "<seo: ProductName/>—Furniture at <seo: StoreName/>". At runtime, the object property tags are replaced with actual values to produce a page title such as "Lounge Chair—Furniture at StoreX".

A page title is just one example of a field that may be included in an SEO content pattern. Other SEO content pattern fields may include, for example, meta description, meta keyword, and image alternate description fields. For example, the meta description pattern "Buy best <seo: ProductName/> from <seo: ProductManufacturerName/> at 50% discount" may be used to produce a meta description such as "Buy best Blue Polo Shirt from StoreY at 50% discount" when the object property tags are replaced with actual values. Similarly, the meta keyword pattern "<seo: ProductKeyword/> <seo: ProductManufacturerName/>" may be used to produce a meta keyword such as "Fabric Sofas ManufacturerZ" when the object property tags are replaced with actual values. Similarly, the image alternate description pattern "Image for <seo: ProductName/> from <seo: StoreName/>" may be used to produce an image alternate description such as "Image for Lounge Chairs from StoreX" when the object property tags are replaced with actual values.

Figure 3:
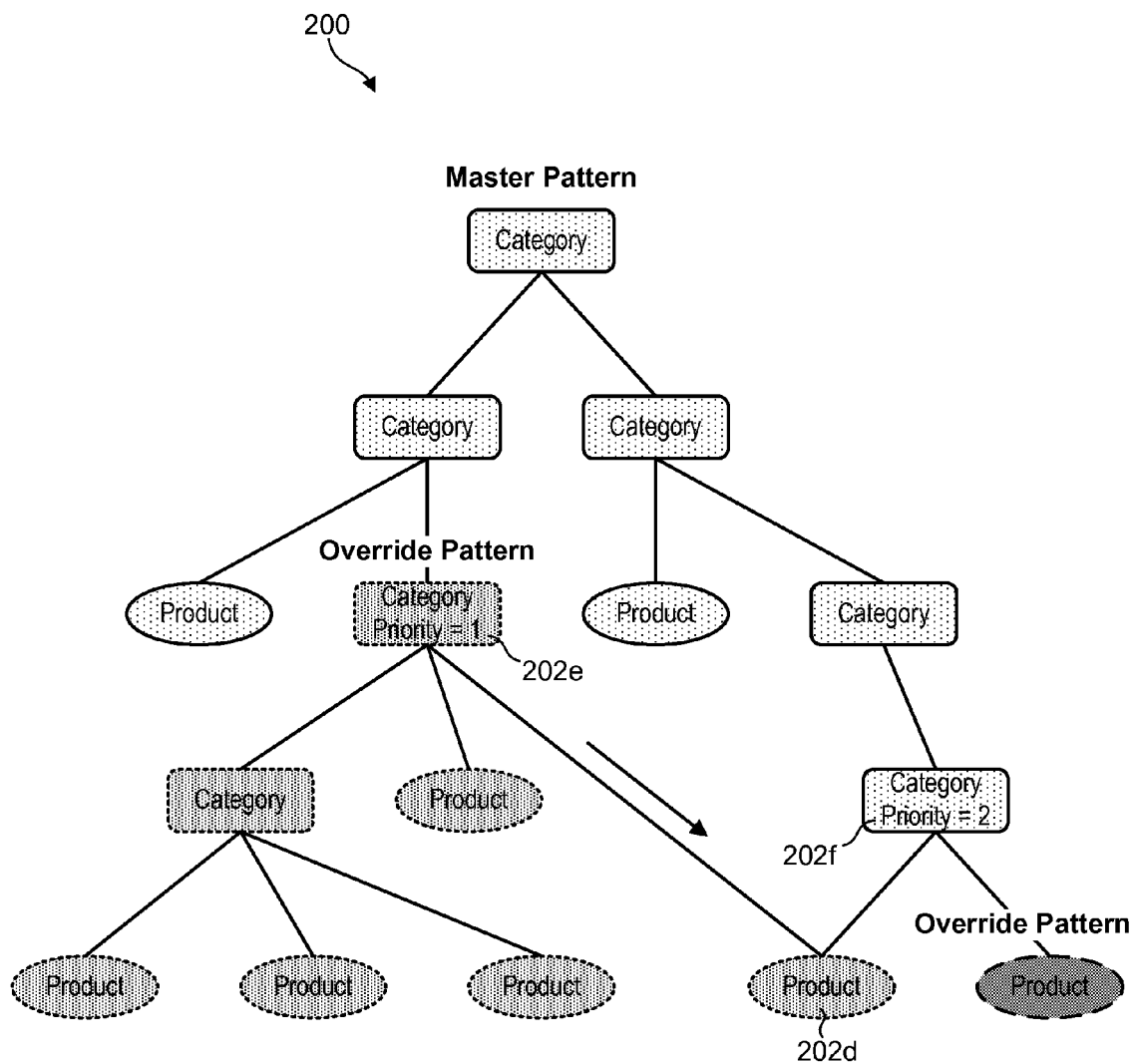
FIG. 3 shows an example of prioritizing the SEO content patterns from multiple parent web pages.

Referring to FIG. 3, in certain cases a child web page may belong to multiple parent web pages in the hierarchical structure 200. Such parent web pages may have different SEO content patterns associated therewith. In order to determine which parent web page a child web page should inherit from, a priority may be assigned to each parent SEO content pattern. In the illustrated example, a child product web page 202*d* belongs to two parent category web pages 202*e*, 202*f*. The SEO content pattern of the category web page 202*e* is assigned a priority of one and the SEO content pattern of the category web page 202*f* is assigned a priority of two. Because the SEO content pattern of the category web page 202*e* has a higher priority (assuming one is a higher priority than two), the child web page 202*d* will inherit the SEO content pattern from the parent category web page 202*e*. In this way, the framework addresses the situation where a child web page has multiple parent web pages.

In other embodiments, the child web page 202*d* may be configured to inherit some SEO content pattern fields from a first parent web page 202*e*, and other SEO content pattern fields from a second parent web page 202*f*. In such a case, a priority may be assigned to each field in the SEO content patterns to determine which SEO content pattern fields a child web page 202*d* will inherit.

Figure 4:
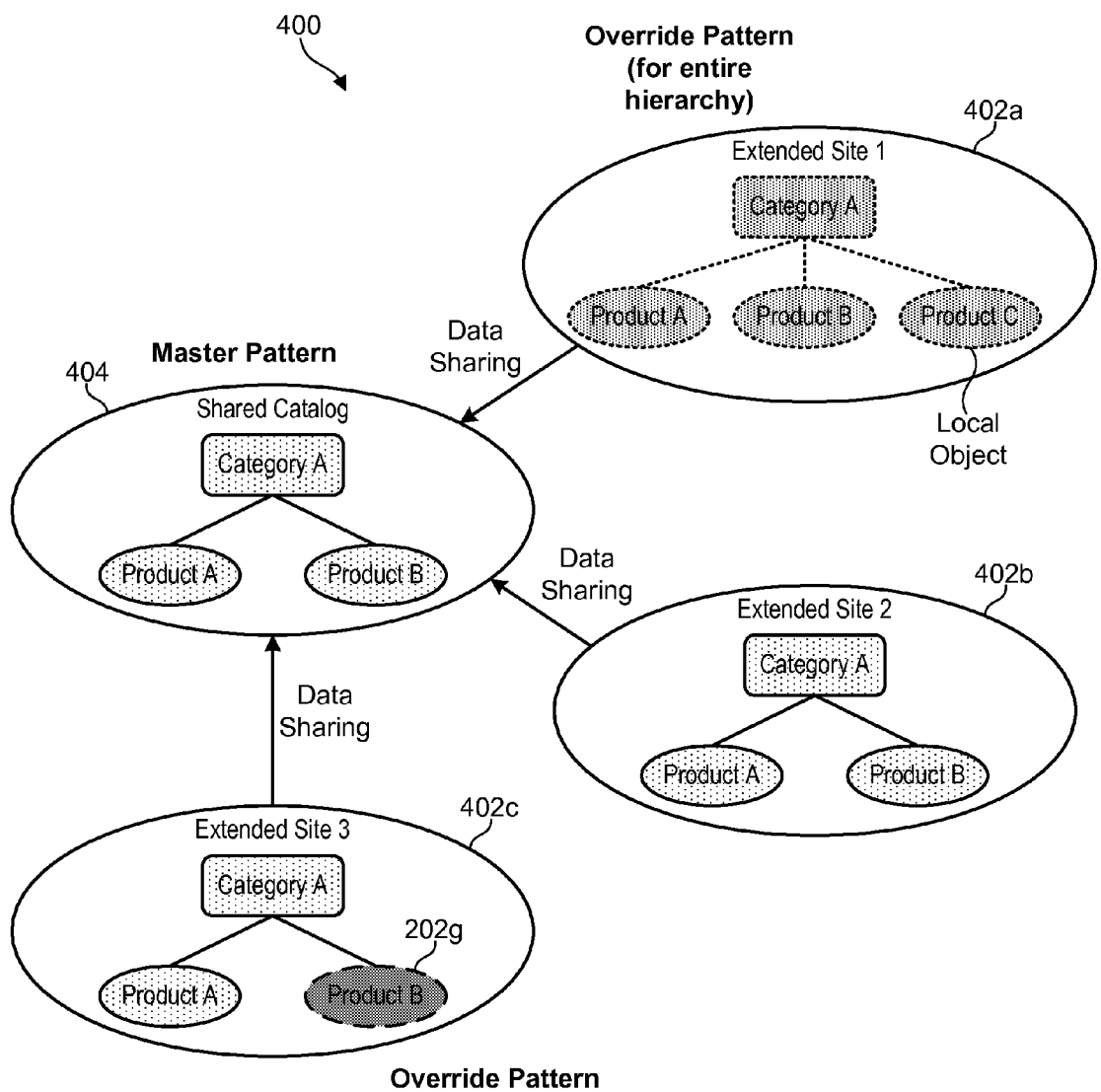
FIG. 4 shows one example of an extended sites environment comprising multiple hierarchical structures, and how SEO content patterns may be inherited or overridden in such an environment.

Referring to FIG. 4, the framework discussed herein may also be applied to an extended sites environment 400. Such an extended sites environment 400 may include multiple extended sites 402, each having its own hierarchical structure 200. Thus, the extended sites environment 400 may be considered a multi-dimensional structure. Each of the extended sites 402 may share some products. Each of the extended sites 402 may also have local (not shared) products in addition to the shared products. The framework may be configured to assign the same or different SEO content patterns to web pages in each of the extended sites 402.

In the extended sites environment 400, SEO content patterns may be defined in a shared catalog asset store 404. In certain embodiments, the initial state of the extended sites environment 400 is for all extended site stores 402 to share the SEO content patterns in the catalog asset store 404. That is, each extended site store 402 will inherit the SEO content patterns defined in the catalog asset store 404. Changing the SEO content patterns in the catalog asset store 404 may cause all of the extended sites 402 to automatically inherit the changes.

In certain embodiments, each of the extended sites 402 may have the capability to override the SEO content patterns in the catalog asset store 404 and use site-specific SEO content patterns. This may allow each extended site store 402 to be unique from other extended site stores 402, if desired. These overrides may be for the entire hierarchical structure 200 or for individual web pages in the hierarchical structure 200. For example, as shown in FIG. 4, all of the SEO content patterns from the catalog asset store 404 may be overridden and replaced with new SEO content patterns in the extended site store 402*a*. By contrast, only the SEO content pattern for an individual web page 202*g* in the extended site 402*c* is overridden and replaced with a new SEO content pattern. Other extended sites, such as the extended site 402*b*, may inherit all of the SEO content patterns from the catalog asset store 404.

Figure 5:
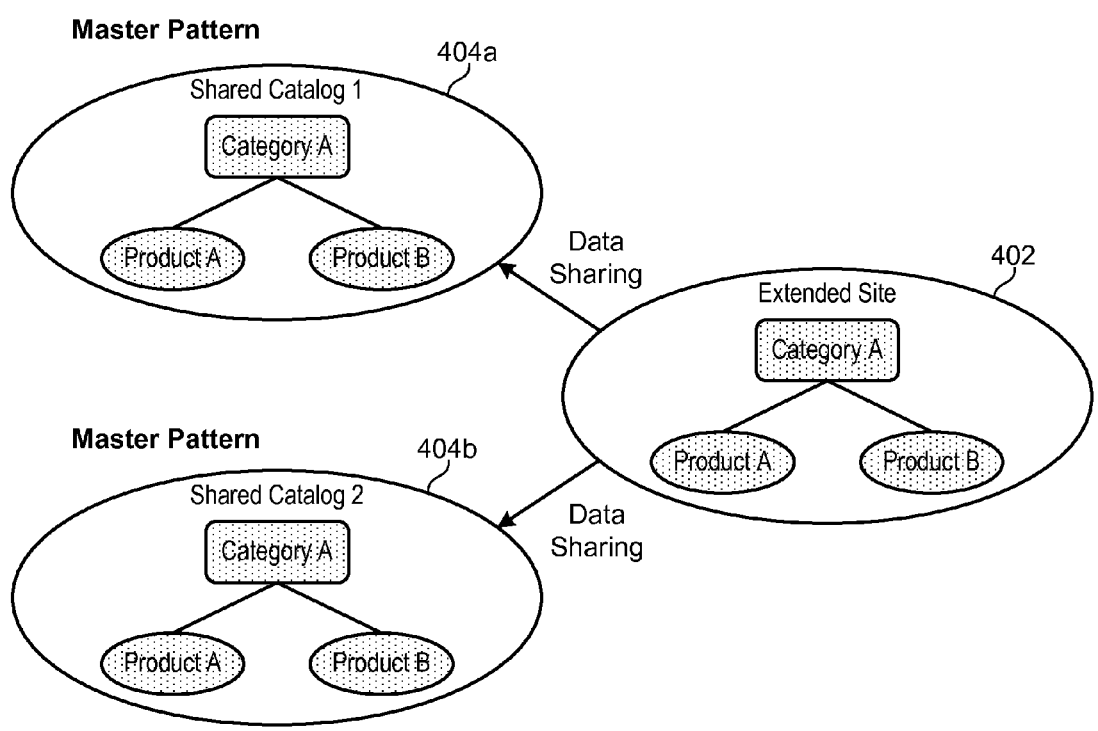
FIG. 5 shows one example of prioritizing the SEO content patterns from multiple catalog asset stores.

Referring to FIG. 5, in certain cases, an extended site 402 may be derived from multiple catalog asset stores 404*a*, 404*b*. In certain embodiments, the SEO content patterns of the extended site 402 may be created by combining SEO content pattern fields from multiple parent catalog asset stores 404*a*, 404*b*. For example, the title and meta description fields may be derived from a first catalog asset store 404*a* and the meta keyword and image alternative description fields may be derived from a second catalog asset store 404*b*. Other combinations or variations are possible and within the scope of the invention.

Figure 6:
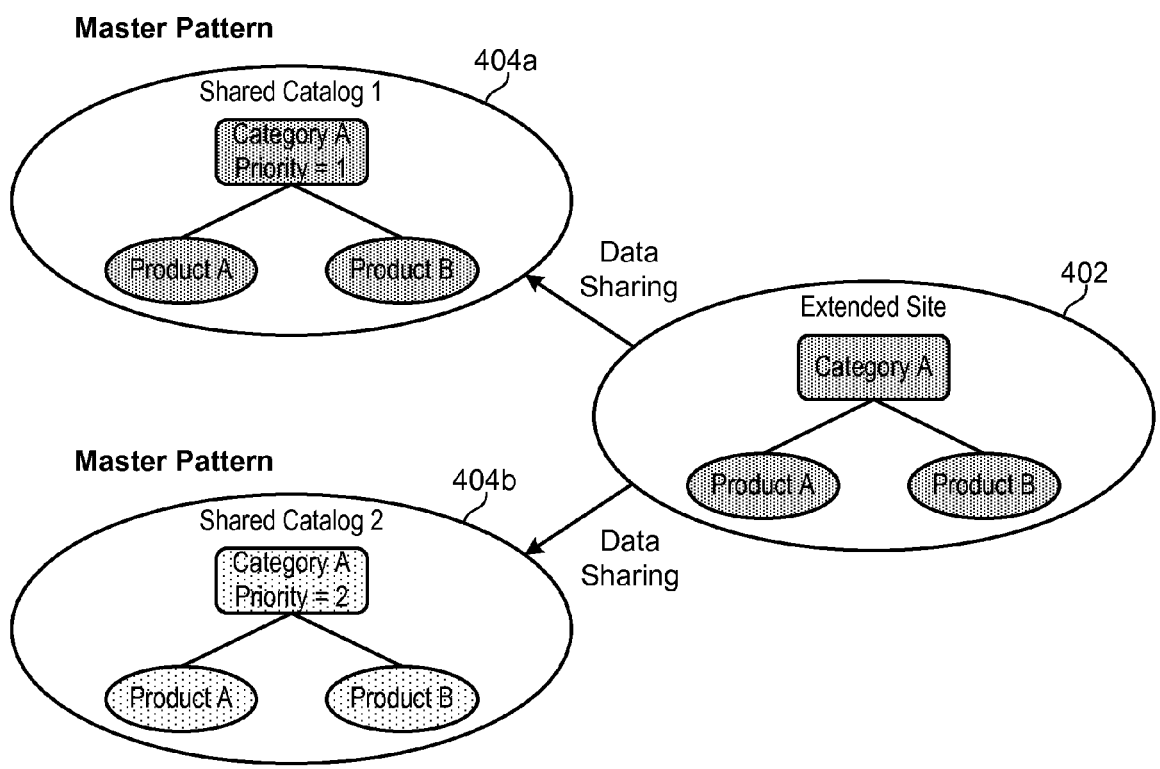
FIG. 6 shows another example of prioritizing the SEO content patterns from multiple catalog asset stores.

Referring to FIG. 6, if each of the catalog asset stores 404*a*, 404*b* has different SEO content patterns, a priority system may be established to determine which SEO content pattern is passed to an extended site 402. In the illustrated example, the SEO content pattern of a first catalog asset store 404*a* is assigned a priority of one and the SEO content pattern of a second catalog asset store 404*b* is assigned a priority of two. Because the SEO content patterns of the first catalog asset store 404*a* have a higher priority than those of the second catalog asset store 404*b*, the extended site 402 will inherit the SEO content patterns from the first catalog asset store 404*a*. Alternatively, priorities may be assigned to fields in the SEO content patterns to determine which fields an extended site 402 will inherit. Using the priorities, the extended site 402 may be configured to inherit some fields from a first catalog asset store 404*a* and other fields from a second catalog asset store 404*b*. In this way, the framework addresses situations where an extended site 402 may inherit SEO content patterns from multiple catalog asset stores 404*a*, 404*b*.

Figure 7:
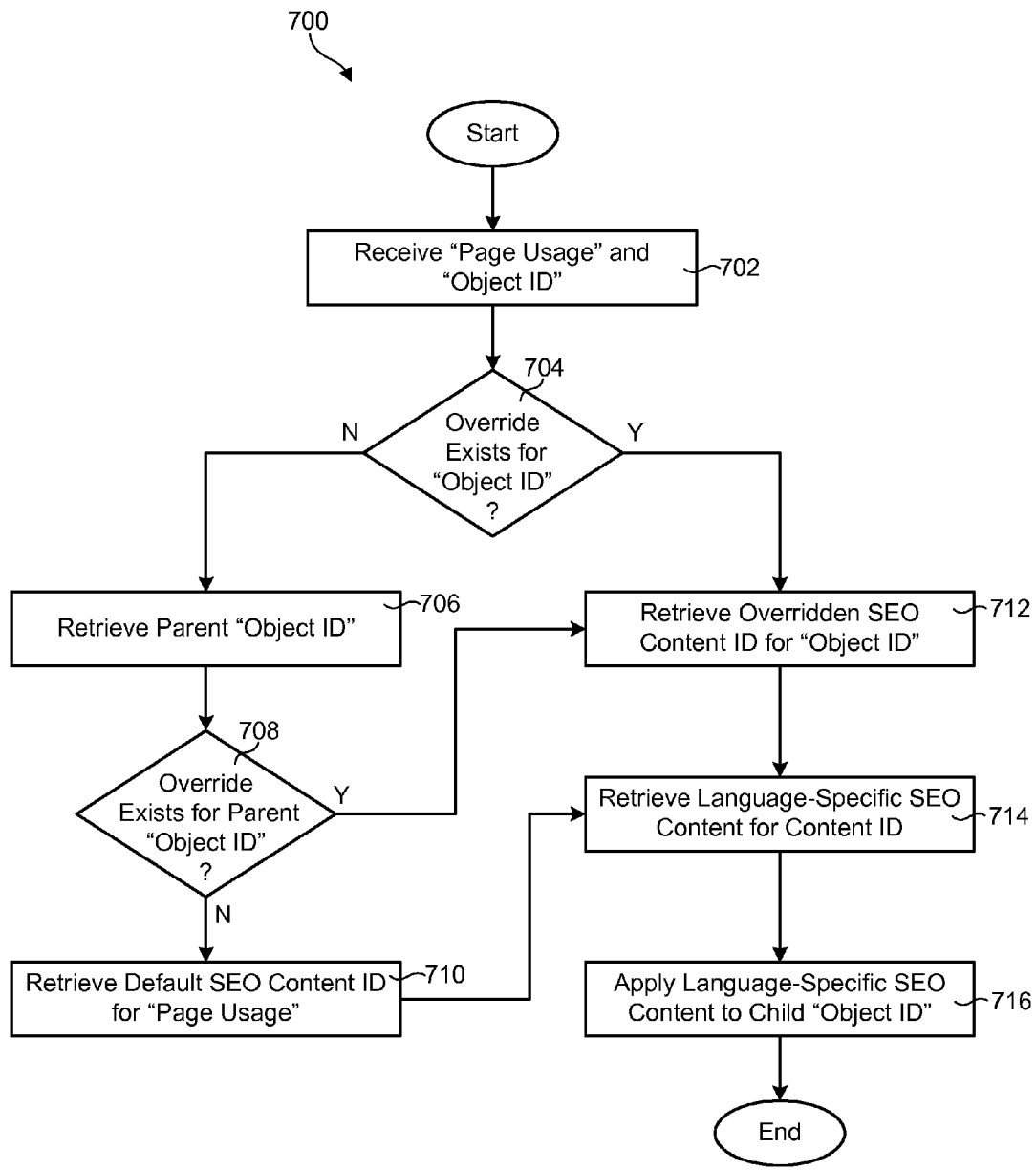
FIG. 7 shows one example of a method for generating SEO content for a web page.

Referring to FIG. 7, one example of a method 700 for generating SEO content for a web page is illustrated. This method 700 uses the principles discussed in FIG. 2 to determine the SEO content for a web page in a hierarchical structure 200. As shown, the method 700 initially receives 702 "page usage" and "object ID" as input parameters. The "page usage" may indicate whether the web page is an item page, product page, or category page, and the "object ID" may identify the specific item, product, or category to be displayed on the web page. The method 700 then determines 704 whether an override exists for the "object ID." If an override exists for the "object ID," the method 700 retrieves 712 an SEO content ID for the "object ID" and, using the SEO content ID, retrieves 714 the language-specific SEO content associated with the SEO content ID. The method 700 then applies 716 the language-specific SEO content to the web page with the "page usage" and "object ID" identified at step 702.

If, at step 704, the method 700 determines 704 that an override does not exist for the "object ID," the method 700 retrieves 706 the parent "object ID" and determines 708 whether an override exists for the parent "object ID." If an override exists for the parent "object ID," the method 700 retrieves 712 an SEO content ID for the parent "object ID" and, using the SEO content ID, retrieves 714 the language-specific SEO content associated with the SEO content ID. The method 700 then applies 716 the language-specific SEO content to the web page identified at step 702.

If, at step 708, the method 700 determines 708 that an override does not exist for the parent "object ID" (which means that no override exists for either the child "object ID" or parent "object ID"), the method 700 retrieves 710 a default content ID for the "page usage" and retrieves 714 the language-specific SEO content for the default content ID. The method 700 then applies 716 the language-specific SEO content to the web page.

The block diagrams in the Figures illustrate the architecture, functionality, and operation of possible implementations of systems, methods, and computer-usable storage media according to various embodiments of the present invention. In this regard, each block in the block diagrams may represent a module, segment, or portion of code, which comprises one or more executable instructions for implementing the specified logical function(s). It should also be noted that, in some alternative implementations, the functions discussed in association with a block may occur in a different order than discussed. For example, two functions occurring in succession may, in fact, be implemented in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The invention claimed is:

1. A method for managing the Search Engine Optimization (SEO) content of web pages, the method comprising:
   providing, by at least one processor, a set of web pages for analysis and ranking by a search engine, wherein the set of web pages is organized in a first hierarchical structure, each web page having an SEO content pattern associated therewith;
   establishing, by the at least one processor, an inheritance scheme for the first hierarchical structure such that the SEO content pattern of a parent web page is inherited by a child web page below the parent web page;
   enabling, by the at least one processor, a user to override the inheritance scheme for a selected web page such that the SEO content pattern of the selected web page overrides the SEO content pattern from its respective parent web page; and
   enabling, by the at least one processor, a user to assign priorities to the SEO content patterns of parent web pages in the first hierarchical structure, such that a child web page that has multiple parent web pages inherits the SEO content pattern of the parent web page with a highest priority.

2. The method of claim 1, wherein the selected web page is also a parent web page.

3. The method of claim 2, further comprising enabling children of the selected web page to inherit the SEO content of the selected web page.

4. The method of claim 2, further comprising enabling children of the selected web page to override the SEO content of the selected web page.

5. The method of claim 1, wherein the inheritance scheme is further configured to enable the web pages of a second hierarchical structure to inherit the SEO content patterns from corresponding web pages in the first hierarchical structure.

6. The method of claim 5, further comprising enabling a user to override the inheritance scheme such that the SEO content patterns of selected web pages in the second hierarchical structure override the SEO content patterns from their corresponding web pages in the first hierarchical structure.

* * * * *